(12) United States Patent
Hirotomi et al.

(10) Patent No.: US 9,651,070 B2
(45) Date of Patent: May 16, 2017

(54) BICYCLE CLAMP STRUCTURE AND BICYCLE OPERATING DEVICE

(71) Applicant: SHIMANO INC., Sakai (JP)

(72) Inventors: Shinya Hirotomi, Sakai (JP);
Yoshimitsu Miki, Sakai (JP); Takaaki Fujiwara, Sakai (JP)

(73) Assignee: SHIMANO INC., Sakai (JP)

( * ) Notice: Subject to any disclaimer, the term of this patent is extended or adjusted under 35 U.S.C. 154(b) by 203 days.

(21) Appl. No.: 14/045,751

(22) Filed: Oct. 3, 2013

(65) Prior Publication Data

US 2015/0096402 A1    Apr. 9, 2015

(51) Int. Cl.
*F16B 2/10*       (2006.01)
*B62K 23/06*   (2006.01)
*B62L 3/02*       (2006.01)

(52) U.S. Cl.
CPC ............. *F16B 2/10* (2013.01); *B62K 23/06* (2013.01); *B62L 3/023* (2013.01); *Y10T 74/20396* (2015.01); *Y10T 74/20822* (2015.01)

(58) Field of Classification Search
CPC ........ Y10T 74/20438; Y10T 403/7182; B62K 23/06; Y74T 74/20822; B62J 11/00; B62J 7/02; B62J 7/06; B62J 9/003; F16B 2/10; F16B 2/065; F16B 2/185; F16L 23/06
USPC ........... 74/502.2, 489, 523; 248/231.51, 74.1
See application file for complete search history.

(56) References Cited

U.S. PATENT DOCUMENTS

| | | | |
|---|---|---|---|
| 1,394,904 A | 10/1921 | Isgrig | |
| 1,893,702 A * | 1/1933 | Glenn | A47B 61/003 |
| | | | 211/107 |
| 2,775,805 A | 1/1957 | Sands | |
| 2,775,806 A * | 1/1957 | Love | F16L 23/06 |
| | | | 24/271 |
| 3,866,956 A * | 2/1975 | Weinhold | F16L 33/12 |
| | | | 285/243 |

(Continued)

FOREIGN PATENT DOCUMENTS

CN    101746466    6/2010
DE   10 2010 037 727    3/2012

(Continued)

OTHER PUBLICATIONS

EPO machine translation of FR 2614657, Romano, Nov. 4, 1988.*

(Continued)

*Primary Examiner* — Vinh Luong
(74) *Attorney, Agent, or Firm* — Mori & Ward, LLP

(57) ABSTRACT

A bicycle clamp structure comprises a first clamp member, a second clamp member, a connecting member, a first connecting structure, a second connecting structure, and a third connecting structure. The second clamp member is configured to clamp a bicycle tube member between the first clamp member and the second clamp member. The connecting member is configured to be arranged between the first clamp member and the second clamp member. The first connecting structure is configured to connect the first clamp member with the connecting member. The second connecting structure is configured to connect the second clamp member with the connecting member. The third connecting structure is configured to connect the first clamp member with the second clamp member.

19 Claims, 8 Drawing Sheets

(56) References Cited

U.S. PATENT DOCUMENTS

| | | | | |
|---|---|---|---|---|
| 4,093,283 | A | * | 6/1978 | Weinhold ................ F16L 21/08 285/243 |
| 4,256,197 | A | * | 3/1981 | Kiser, Jr. ...................... 180/335 |
| 4,568,115 | A | * | 2/1986 | Zimmerly .................... 285/411 |
| 4,573,717 | A | * | 3/1986 | Peacock .................. F16B 2/185 24/270 |
| 4,639,979 | A | | 2/1987 | Polson |
| 4,852,840 | A | | 8/1989 | Marks |
| 4,969,923 | A | | 11/1990 | Reeder et al. |
| 5,584,210 | A | * | 12/1996 | Gelbein ........................ 74/489 |
| 5,666,711 | A | * | 9/1997 | Pfeiffer .................. B21D 39/04 269/43 |
| 5,921,669 | A | | 7/1999 | Taylor et al. |
| 6,332,373 | B1 | | 12/2001 | Iteya et al. |
| 6,761,467 | B2 | * | 7/2004 | Matthews ............... F21L 4/005 362/202 |
| 7,828,340 | B2 | * | 11/2010 | Heelan, Jr. ............ F16L 21/065 285/366 |
| 9,402,016 | B1 | | 7/2016 | Hidalgo |
| 2005/0160870 | A1 | * | 7/2005 | Barnett ........................ 74/523 |
| 2005/0274758 | A1 | | 12/2005 | Jefferson |
| 2006/0029465 | A1 | | 2/2006 | Auer |
| 2007/0138351 | A1 | | 6/2007 | Wu |
| 2007/0258758 | A1 | | 11/2007 | Ho |
| 2009/0085766 | A1 | | 4/2009 | Seydoux et al. |
| 2009/0173182 | A1 | * | 7/2009 | Watarai et al. ............. 74/502.2 |
| 2009/0315692 | A1 | * | 12/2009 | Miki et al. .................... 340/432 |
| 2010/0139442 | A1 | | 6/2010 | Tsumiyama |
| 2010/0164243 | A1 | * | 7/2010 | Albin ...................... B66F 9/065 294/106 |
| 2010/0224740 | A1 | | 9/2010 | Hirose et al. |
| 2010/0327576 | A1 | * | 12/2010 | Linhorst ................. F16L 25/12 285/38 |
| 2011/0247448 | A1 | * | 10/2011 | Weiss ..................... B62K 25/08 74/551.8 |
| 2011/0253863 | A1 | | 10/2011 | Weiss et al. |
| 2012/0056049 | A1 | * | 3/2012 | Aguirrezabal ............... 248/74.1 |
| 2013/0152726 | A1 | | 6/2013 | Miki et al. |
| 2014/0026710 | A1 | | 1/2014 | Takeuchi et al. |
| 2014/0333068 | A1 | * | 11/2014 | Ikushima .................. F16B 2/10 285/409 |
| 2015/0000455 | A1 | | 1/2015 | Hirotomi et al. |
| 2015/0165904 | A1 | | 6/2015 | Van |

FOREIGN PATENT DOCUMENTS

| | | |
|---|---|---|
| DE | 10 2012 222 347 | 6/2013 |
| DE | 10 2013 005 766 | 5/2014 |
| EP | 2135804 | 12/2009 |
| FR | 2614657 | 11/1988 |
| JP | 2007-092980 | 4/2007 |
| WO | WO 96/10711 A1 * | 4/1996 |
| WO | WO 2011/116079 A1 * | 9/2011 |
| WO | WO 2013/174750 | 11/2013 |
| WO | WO 2014/063678 | 5/2014 |

OTHER PUBLICATIONS

German Search Report for corresponding DE Application No. 10 2014 013 108.4, Aug. 21, 2015.

German Search Report for corresponding DE Application No. 10 2014 014 551.4, Aug. 24, 2015.

Office Action with Form PTO-892 Notice of References Cited issued by the U.S. Patent and Trademark Office for a divisional U.S. Appl. No. 14/285,559, Jan. 8, 2016.

Office Action with Form PTO-892 Notice of References Cited issued by the U.S. Patent and Trademark Office for the co-pending U.S. Appl. No. 14/285,559, Aug. 14, 2015.

Office Action with Form PTO-892 Notice of References Cited issued by the U.S. Patent and Trademark Office for the divisional U.S. Appl. No. 14/285,559, May 19, 2016.

Office Action with Form PTO-892 Notice of References Cited issued by the United States Patent and Trademark Office for the divisional U.S. Appl. No. 14/285,559, Sep. 27, 2016.

* cited by examiner

BICYCLE CLAMP STRUCTURE AND BICYCLE OPERATING DEVICE

BACKGROUND OF THE INVENTION

Field of the Invention

The present invention relates to a bicycle clamp structure and a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Bicycles are often provided with a bicycle operating device for operating a bicycle component. The bicycle operating device is attached to a bicycle tube ember via a clamp structure.

SUMMARY OF THE INVENTION

In accordance with a first aspect of the present invention, a bicycle clamp structure comprises a first clamp member, a second clamp member, a connecting member, a first connecting structure, a second connecting structure, and a third connecting structure. The second clamp member is configured to clamp a bicycle tube member between the first clamp member and the second clamp member. The connecting member is configured to be arranged between the first clamp member and the second clamp member. The first connecting structure is configured to connect the first clamp member with the connecting member. The second connecting structure is configured to connect the second clamp member with the connecting member. The third connecting structure is configured to connect the first clamp member with the second clamp member.

In accordance with a second aspect of the present invention, the bicycle clamp structure according to the first aspect is configured so that the first clamp member is made of a first material. The second clamp member is made of a second material. The connecting member is made of a third material which differs from at least one of the first material and the second material.

In accordance with a third aspect of the present invention, the bicycle clamp structure according to the second aspect is configured so the third material differs from the first material and the second material.

In accordance with a fourth aspect of the present invention, the bicycle clamp structure according to the third aspect is configured so that the first material is the same as the second material.

In accordance with a fifth aspect of the present invention, the bicycle clamp structure according to the fourth aspect is configured so that the third material is harder than the first material and the second material.

In accordance with a sixth aspect of the present invention, the bicycle clamp structure according to the fifth aspect is configured so that the first material comprises an aluminum alloy. The second material comprises an aluminum alloy. The third material comprises one of titanium, stainless steel, and iron.

In accordance with a seventh aspect of the present invention, the bicycle clamp structure according to the first aspect is configured so that the first connecting structure is configured to connect the connecting member to the first clamp member such that the connecting member is pivotable with respect to the first clamp member.

In accordance with an eighth aspect of the present invention, the bicycle clamp structure according to the seventh aspect is configured so that the first connecting structure includes a first through-hole and a pivot pin. The first through-hole is provided on the connecting member. The pivot pin is configured to be fixedly provided on the first clamp member and is configured to pass through the first through-hole of the connecting member.

In accordance with a ninth aspect of the present invention, the bicycle clamp structure according to the seventh aspect is configured so that the second connecting structure is configured to fixedly connect the connecting member to the second clamp member.

In accordance with a tenth aspect of the present invention, the bicycle clamp structure according to the ninth aspect is configured so that the second connecting structure includes at least two second through-holes and at least two fixing pins. The at least two second through-holes are provided on the connecting member. The at least two fixing pins are configured to be fixedly provided on the second clamp member and are configured to pass through the at least two second through-holes of the connecting member, respectively.

In accordance with an eleventh aspect of the present invention, the bicycle clamp structure according to the first aspect is configured so that the first clamp member includes a first slit. The connecting member includes a first end portion configured to be provided in the first slit.

In accordance with a twelfth aspect of the present invention, the bicycle clamp structure according to the eleventh aspect is configured so that the second clamp member includes a second slit. The connecting member includes a second end portion configured to be provided in the second slit.

In accordance with a thirteenth aspect of the present invention, the bicycle clamp structure according to the first aspect is configured so that the first clamp member has a first width defined in an axial direction of the bicycle tube member. The second clamp member has a second width defined in the axial direction. The connecting member has a third width defined in the axial direction. The third width is smaller than the first width and the second width.

In accordance with a fourteenth aspect of the present invention, the bicycle clamp structure according to the seventh aspect further comprises a lock mechanism configured to restrict pivotal movement of the connecting member with respect to the first clamp member.

In accordance with a fifteenth aspect of the present invention, the bicycle clamp structure according to the fourteenth aspect is configured so that the lock mechanism includes a lock pin provided in the first clamp member. The lock pin is configured to be movable between a lock position at which the lock pin restricts pivotal movement of the connecting member with respect to the first clamp member, and a release position at which the lock pin allows the connecting member to pivot with respect to the first clamp member.

In accordance with a sixteenth aspect of the present invention, the bicycle clamp structure according to the fifteenth aspect is configured so that the lock pin is configured to be movable parallel to an axial direction of the bicycle tube member.

In accordance with a seventeenth aspect of the present invention, the bicycle clamp structure according to the fifteenth aspect is configured so that the lock mechanism includes a biasing member provided in the first clamp member and configured to bias the lock pin to the lock position.

In accordance with an eighteenth aspect of the present invention, the bicycle clamp structure according to the seventeenth aspect is configured so that the connecting member includes a contact surface configured to contact the lock pin disposed at the lock position.

In accordance with a nineteenth aspect of the present invention, a bicycle operating device comprises the bicycle clamp structure and an operating structure. The operating structure is configured to operate a bicycle component and provided on one of the first clamp member, the second clamp member and the connecting member.

In accordance with a twentieth aspect of the present invention, the bicycle operating device according to the nineteenth aspect is configured so the operating structure is configured to operate a bicycle brake component.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
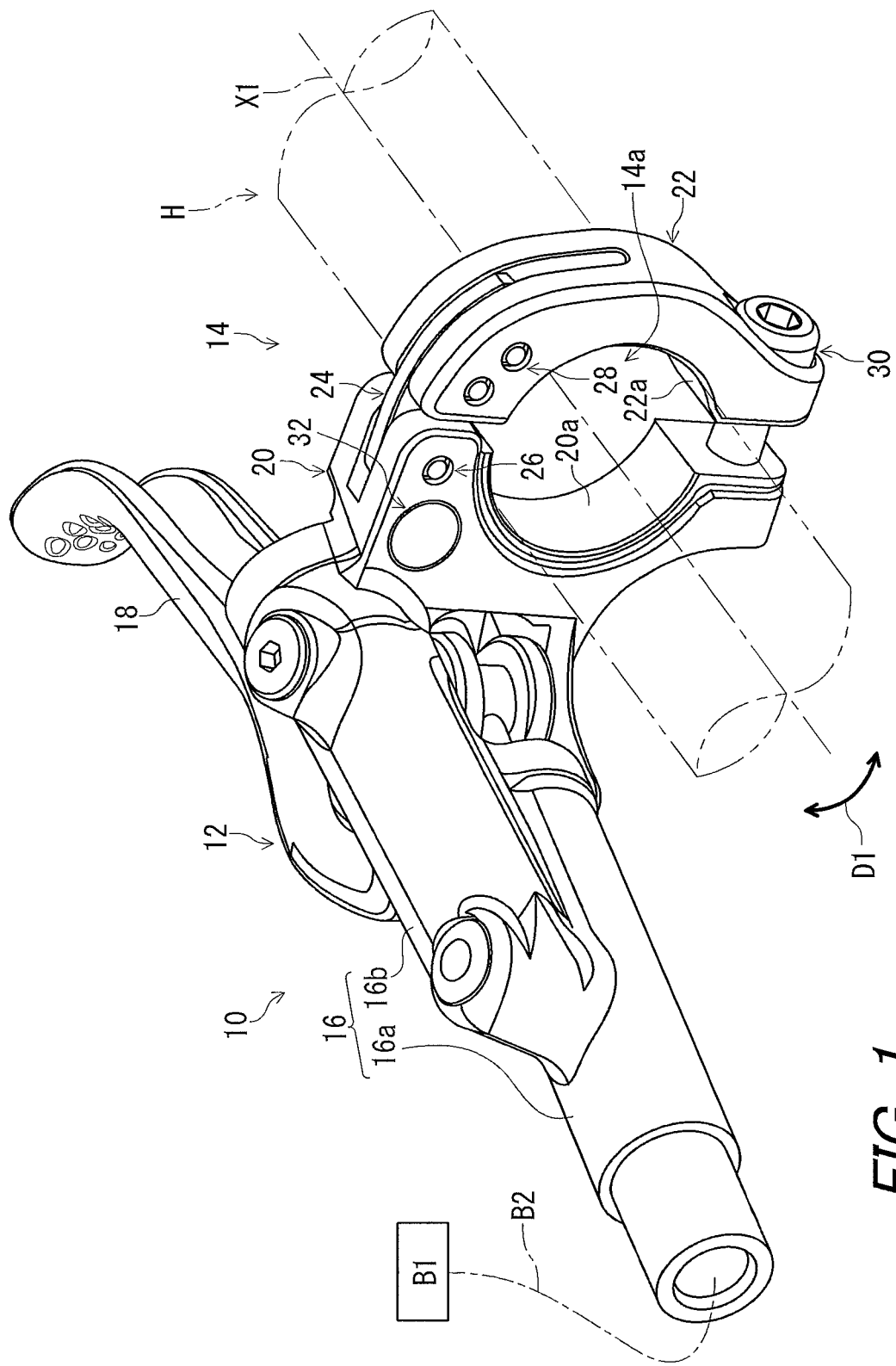
FIG. 1 is a perspective view of a bicycle operating device in accordance with one embodiment.

The embodiments will now be described with reference to the accompanying drawings, wherein like reference numerals designate corresponding or identical elements throughout the various drawings.

Figure 2:
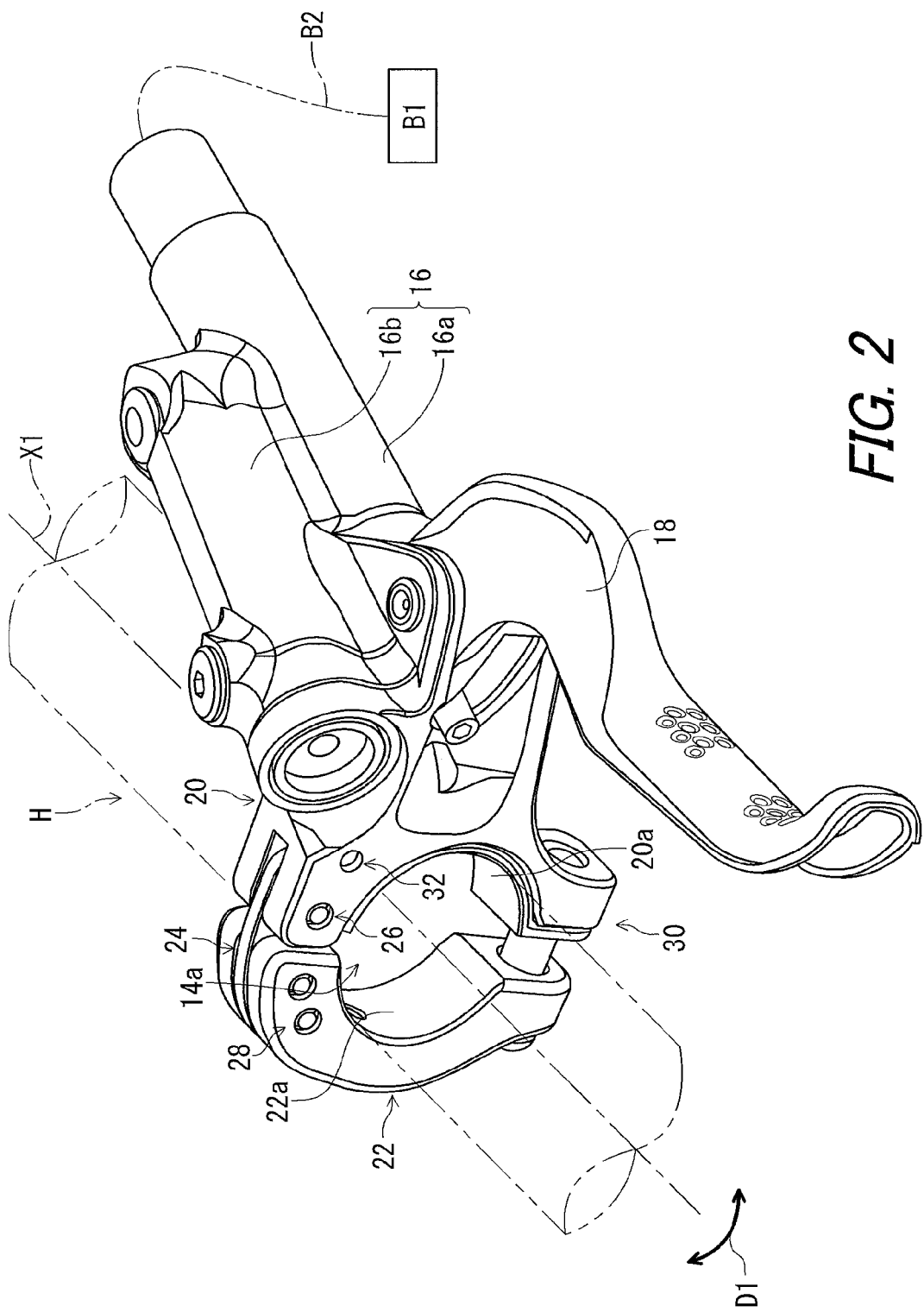
FIG. 2 is a perspective view of the bicycle operating device in accordance with one embodiment.

Referring initially to FIGS. 1 and 2, a bicycle operating device 10 in accordance with one embodiment is configured to be attached to a bicycle tube member of a bicycle for operating bicycle components. In the illustrated embodiment, the bicycle tube member comprises a bicycle handlebar H of the bicycle. However, it will be apparent to those skilled in the bicycle field from the present disclosure that the bicycle operating device 10 can be configured to be attached to a bicycle tube member other than the bicycle handlebar H. The bicycle operating device 10 is a right bicycle operating device configured to be operated with a rider's right hand. However, it will be apparent to those skilled in the bicycle field from the present disclosure that the configuration of the bicycle operating device 10 can be applied to a left bicycle operating device.

In the present application, the following directional terms "front", "rear", "forward", "rearward", "left", "right", "transverse", "upward" and "downward" as well as any other similar directional terms refer to those directions which are determined on the basis of the rider who sits on a saddle (now shown) of the bicycle with facing the bicycle handlebar H1, for example. Accordingly, these terms, as utilized to describe the bicycle operating device 10, should be interpreted relative to the bicycle as used in an upright riding position on a horizontal surface.

As seen in FIGS. 1 and 2, the bicycle operating device 10 comprises an operating structure 12 and a bicycle clamp structure 14. The operating structure 12 is configured to operate a bicycle component such as a bicycle brake component B1. The bicycle clamp structure 14 is configured to be detachably couple to the bicycle handlebar H.

As seen in FIGS. 1 and 2, in the illustrated embodiment, the operating structure 12 includes a main body 16 and a lever 18. The main body 16 includes a master cylinder 16a and a fluid reservoir tank 16b. The lever 18 is configured to be pivotally provided relative to the master cylinder 16a of the main body 16. The master cylinder 16a is fluidly communicated with the fluid reservoir tank 16b and accommodates a master piston (not shown) therein. The operating structure 12 is configured to generate hydraulic pressure in response to pivotal movement of the lever 18. The operating structure 12 is operatively coupled to the bicycle brake component B1 via a hydraulic hose B2, for example. Since such a brake operating system is conventional and well known, it will not be described in more detail here for the sake of simplify. While the operating structure 12 is a hydraulic brake operating device, it will be apparent to those skilled in the bicycle field from the present disclosure that the operating structure 12 can be other kinds of brake operating devices. Furthermore, the operating structure 12 can be other kinds of operating devices (e.g., a bicycle shift operating device) other than the bicycle brake operating device. Since the operating structure 12 includes well known structures, they will not be described in detail herein.

As seen in FIGS. 1 and 2, the bicycle clamp structure 14 comprises a first clamp member 20, a second clamp member 22, a connecting member 24, a first connecting structure 26, a second connecting structure 28, and a third connecting structure 30. The bicycle clamp structure 14 further comprises a lock mechanism 32. The operating structure 12 is provided on one of the first clamp member 20, the second clamp member 22 and the connecting member 24. In the illustrated embodiment, the operating structure 12 is provided on the first clamp member 20.

The first clamp member 20 is attached to the main body 16 of the operating structure 12. In the illustrated embodiment, the first clamp member 20 is integrally provided with the main body 16 as a one-piece unitary member. However, it will be apparent to those skilled in the bicycle field from the present disclosure that the first clamp member 20 can be a separated member from the operating structure 12. The first clamp member 20 includes a first curved surface 20a. The first curved surface 20a is configured to contact the bicycle handlebar H and extends in a circumference direction D1 of the bicycle handlebar H. The circumference direction D1 is defined about a longitudinal center axis Xl of the bicycle handlebar H.

The second clamp member 22 is configured to clamp the bicycle handlebar H between the first clamp member 20 and the second clamp member 22. The second clamp member 22 is a separate member from the first clamp member 20 and the main body 16 of the operating structure 12. The second clamp member 22 is configured to be disposed on an opposite side of the first clamp member 20 with respect to the longitudinal center axis X1 of the bicycle handlebar H in a state where the bicycle clamp structure 14 clamps the bicycle handlebar H. The first clamp member 20 and the second clamp member 22 are configured to define a clamp opening 14a through which the bicycle handlebar H is to extend. The second clamp member 22 includes a second curved surface 22a. The second curved surface 22a is configured to contact the bicycle handlebar H and extends in the circumference direction D1 of the bicycle handlebar H. The first curved surface 20a and the second curved surface 22a are configured to define the clamp opening 14a.

The connecting member 24 is configured to be arranged between the first clamp member 20 and the second clamp member 22. The connecting member 24 is a separate member from the main body 16, the first clamp member 20, and the second clamp member 22.

Figure 3:
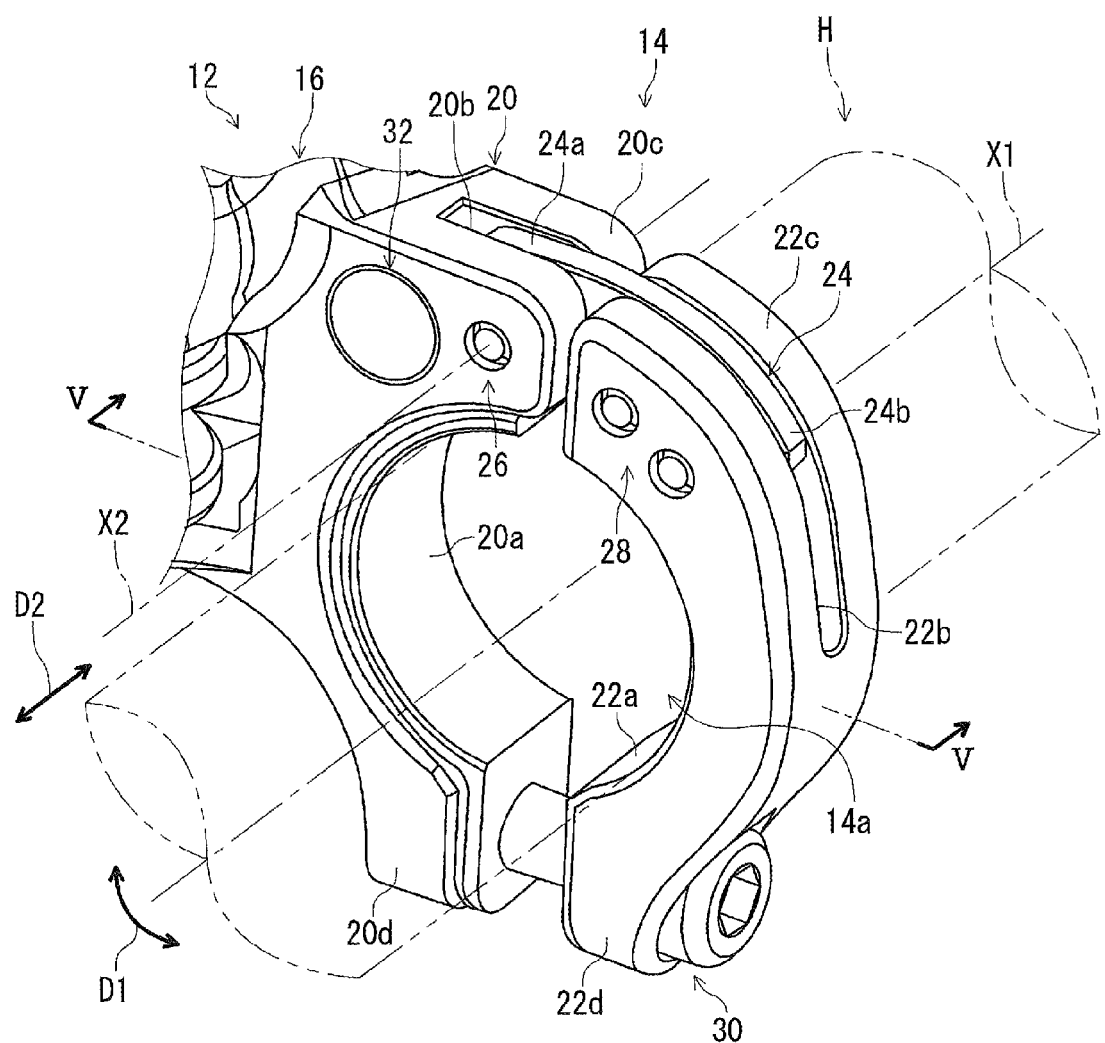
FIG. 3 is a partial perspective view of a bicycle clamp structure of the bicycle operating device illustrated in FIG. 1.

As seen in FIG. 3, the first clamp member 20 includes a first slit 20b. The connecting member 24 includes a first end portion 24a configured to be provided in the first slit 20b. The second clamp member 22 includes a second slit 22b. The connecting member 24 includes a second end portion 24b configured to be provided in the second slit 22b. However, it will be apparent to those skilled in the bicycle field from the present disclosure that at least one of the first slit 20b and the second slit 22b can be omitted if needed and/or desired.

In the illustrated embodiment, the first clamp member 20 is made of a first material. The second clamp member 22 is made of a second material. The connecting member 24 is made of a third material which differs from at least one of the first material and the second material. More specifically, the third material differs from the first material and the second material. Furthermore, the third material is harder than the first material and the second material. In other words, the third material has strength higher than strength of each of the first material and the second material. For example, the third material has tensile strength higher than tensile strength of each of the first material and the second material. In the illustrated embodiment, the first material comprises an aluminum alloy. The second material comprises an aluminum alloy. The third material comprises one of titanium, stainless steel, and iron. While the first material is the same as the second material, the first material can be different from the second material.

As seen in FIG. 3, the first connecting structure 26 is configured to connect the first clamp member 20 with the connecting member 24. In the illustrated embodiment, the first connecting structure 26 is configured to connect the connecting member 24 to the first clamp member 20 such that the connecting member 24 is pivotable with respect to the first clamp member 20. The first clamp member 20 includes a third end portion 20c and a fourth end portion 20d opposite to the third end portion 20c in the circumference direction D1. The first connecting structure 26 is configured to connect the first end portion 24a of the connecting member 24 to the third end portion 20c of the first clamp member 20 such that the connecting member 24 is pivotable about a pivot axis X2 with respect to the first clamp member 20. The pivot axis X2 is parallel to an axial direction D2 defined along the longitudinal center axis X1 of the bicycle handlebar H.

As seen in FIG. 3, the second connecting structure 28 is configured to connect the second clamp member 22 with the connecting member 24. In the illustrated embodiment, the second connecting structure 28 is configured to fixedly connect the connecting member 24 to the second clamp member 22. The second clamp member 22 includes a fifth end portion 22c and a sixth end portion 22d opposite to the fifth end portion 22c in the circumference direction D1. The second connecting structure 28 is configured to fixedly connect the second end portion 24b of the connecting member 24 to the fifth end portion 22c of the second clamp member 22. The second clamp member 22 and the connecting member 24 are configured to integrally pivot about the pivot axis X2 relative to the first clamp member 20. However, it will be apparent to those skilled in the bicycle field from the present disclosure that the second connecting structure 28 can be configured to connect the connecting member 24 to the second clamp member 22 such that the connecting member 24 is pivotable with respect to the second clamp member 22. Furthermore, the first connecting structure 26 and the second connecting structure 28 can be configured such that at least one of the first clamp member 20 and the second clamp member 22 is pivotable with respect to the connecting member 24.

As seen in FIG. 3, the third connecting structure 30 is configured to connect the first clamp member 20 with the second clamp member 22. The third connecting structure 30 includes a bolt 34 configured to tighten the first clamp member 20 and the second clamp member 22 to clamp the bicycle handlebar H. The third connecting structure 30 is configured to connect the fourth end portion 20d of the first clamp member 20 with the sixth end portion 22d of the second clamp member 22.

Figure 4:
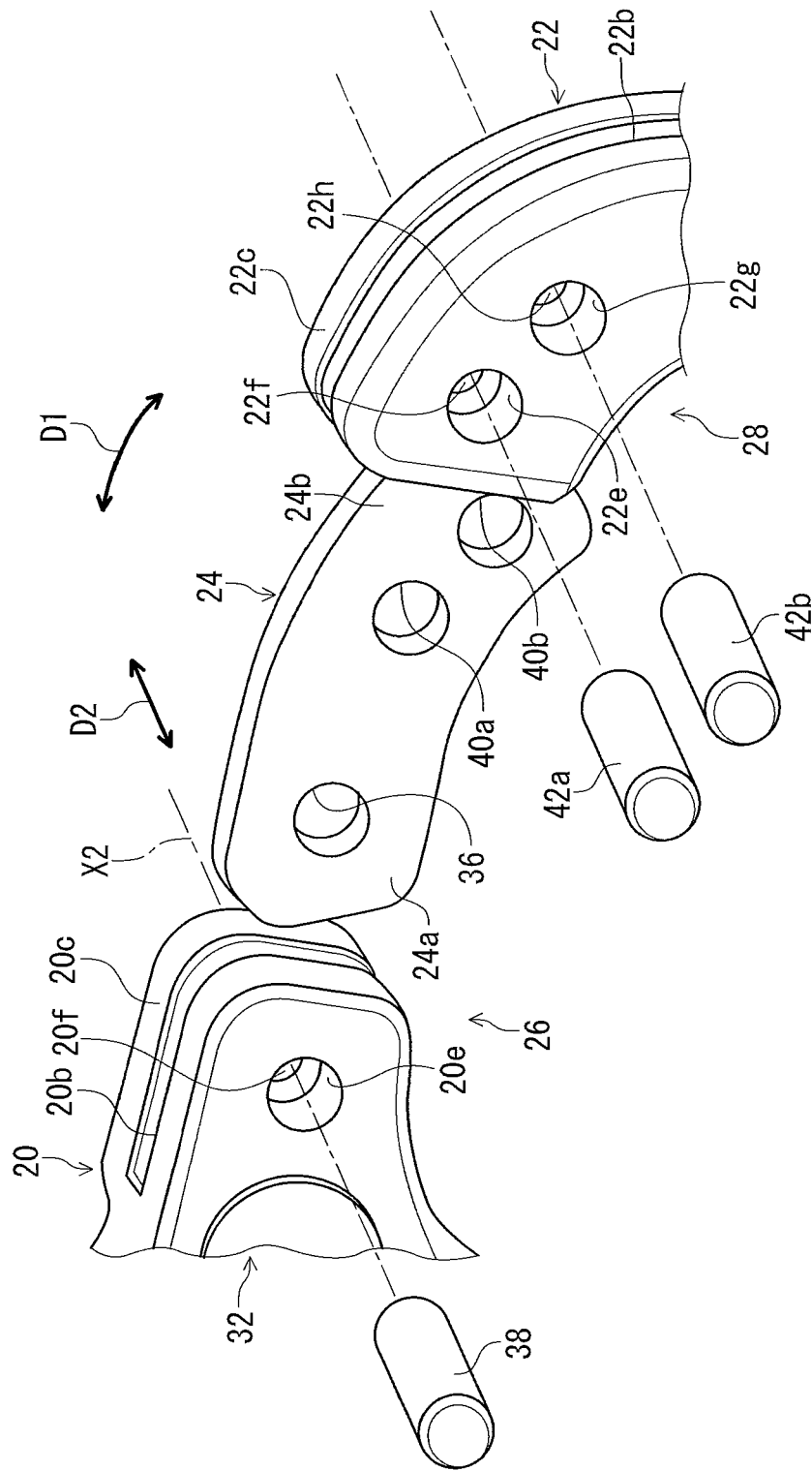
FIG. 4 is an exploded perspective view of a part of the bicycle clamp structure illustrated in FIG. 3.

As seen in FIG. 4, the first connecting structure 26 includes a first through-hole 36 and a pivot pin 38. The first through-hole 36 is provided on the connecting member 24. The pivot pin 38 is configured to be fixedly provided on the first clamp member 20 and is configured to pass through the first through-hole 36 of the connecting member 24. The first clamp member 20 includes first fixing through-holes 20e and 20f extending in the axial direction D2. The pivot pin 38 is configured to extend through the first fixing through-holes 20e and 20f and the first through-hole 36 in the axial direction D2. The pivot pin 38 is configured to be press-fitted in at least one of the first fixing through-holes 20e and 20f through the first through-hole 36, for example. An inner diameter of the first through-hole 36 is larger than an outer diameter of the pivot pin 38 such that the connecting member 24 is pivotable relative to the first clamp member 20 about the pivot pin 38. The pivot pin 38 defines the pivot axis X2. It will be apparent to those skilled in the bicycle field from the present disclosure that the pivot pin 38 is not limited to the illustrated structure. Other suitable pivotal structures such as a bolt or a rivet can be used as needed and/or desired.

As seen in FIG. 4, the second connecting structure 28 includes two second through-holes 40a and 40b and two fixing pins 42a and 42b. The second through-holes 40a and 40b are provided on the connecting member 24. The fixing pins 4a and 42b are configured to be fixedly provided on the second clamp member 22 and are configured to pass through the second through-holes 40a and 40b of the connecting member 24, respectively, and thereby fixedly and non-pivotally connect the second clamp member 22 with the connecting member 24 so as to prevent the second clamp member 22 from pivoting with respect to the connecting member 24 even when the third connecting structure 30 is not fixedly connecting the first clamp member 20 with the second clamp member 22 when the bicycle clamp structure 14 is in a non-clamped state. The second clamp member 22 includes second fixing through-holes 22e, 22f, 22g and 22h. The second fixing through-holes 22e, 22f, 22g and 22h extend in the axial direction D2. The fixing pin 42a extends through the second fixing through-holes 22*e* and 22*f* and the second through-holes 40*a* in the axial direction D2. The fixing pin 42*b* extends through the second fixing through-holes 22*g* and 22*h* and the second through-hole 40*b* in the axial direction D2. The fixing pin 42*a* is configured to be press-fitted in at least one of the second fixing through-holes 22*e* and 22*f* through the second through-hole 40*a*. The fixing pin 42*b* is configured to be press-fitted in at least one of the first fixing through-holes 22*g* and 22*h* through the second through-hole 40*b*. Inner diameters of the second through-holes 40*a* and 40*b* are larger than outer diameter of the fixing pins 4*a* and 42*b*, respectively.

As seen in FIG. 4, the second connecting structure 28 includes the second through-holes 40*a* and 40*b* and the fixing pins 42*a* and 42*b*. However, it will be apparent to those skilled in the bicycle field from the present disclosure that the second connecting structure 28 can include at least two second through-holes and at least two fixing pins. In such embodiment, the at least two second through-holes can be provided on the connecting member 24. The at least two fixing pins can be configured to be fixedly provided on the second clamp member 22 and configured to pass through the at least two second through-holes of the connecting member 24, respectively.

As seen in FIG. 4, the pivot pin 38 is a separate member from each of the first clamp member 20 and the connecting member 24. However, it will be apparent to those skilled in the bicycle field from the present disclosure that the pivot pin 38 can be integrally provided with one of the first clamp member 20 and the connecting member 24. Similarly, the fixing pins 42*a* and 42*b* are separate members from each of the second clamp member 22 and the connecting member 24. However, it will be apparent to those skilled in the bicycle field from the present disclosure that the fixing pins 42*a* and 42*b* can be integrally provided with one of the second clamp member 22 and the connecting member 24.

As seen in FIG. 4, the first through-hole 36 and the second through-holes 40*a* and 40*b* are aligned in the circumference direction D1. The first through-hole 36 is provided at the first end portion 24*a* of the connecting member 24. The second through-holes 40*a* and 40*b* are provided at the second end portion 24*b* of the connecting member 24. Thus, one of the second through-holes 40*a* and 40*b* is closer to another of the second through-holes 40*a* and 40*b* than the first through-hole 36.

Figure 5:
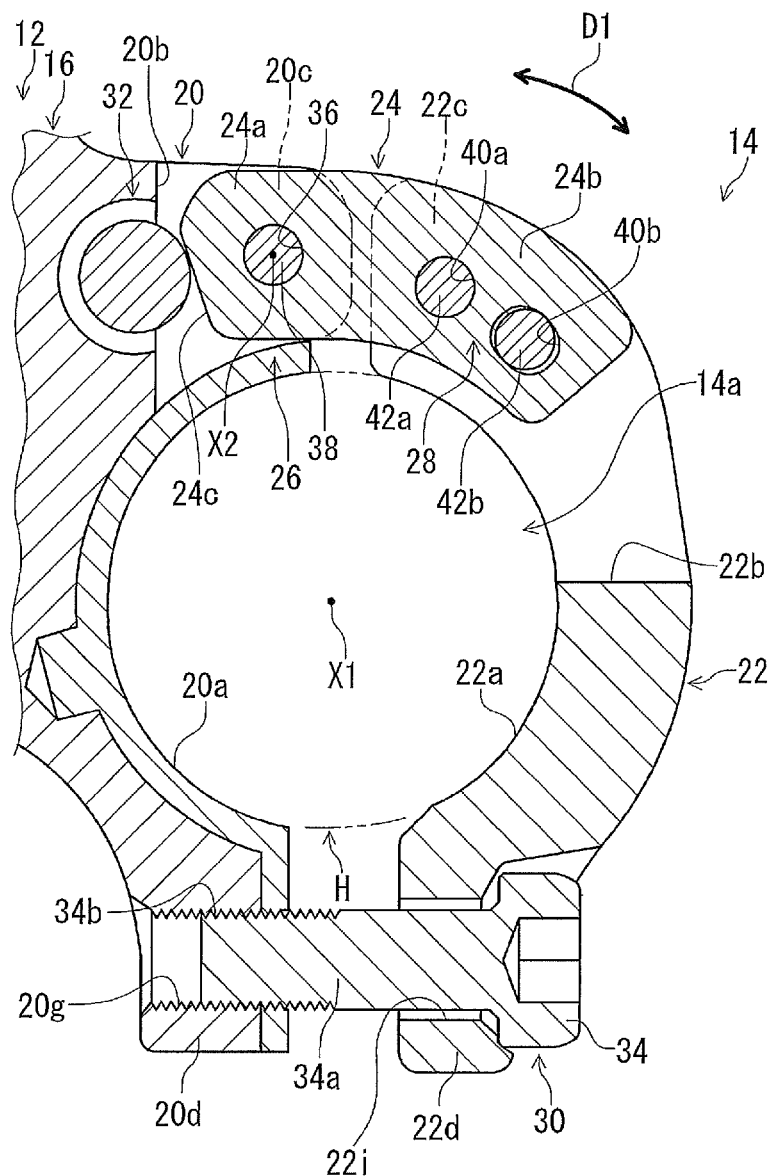
FIG. 5 is a cross-sectional view of the bicycle clamp structure taken along line V-V of FIG. 3.

As seen in FIG. 5, the first through-hole 36 is disposed in an area in which the first slit 20*b* is provided when viewed from the axial direction D2 defined along the longitudinal center axis X1. The second through-holes 40*a* and 40*b* are disposed in an area in which the second slit 22*b* is provided when viewed from the axial direction D2. The second through-hole 40*b* has a shape different from a shape of the second through-hole 40*a*. In the illustrated embodiment, the second through-hole 40*b* is an elongated hole extending in the circumference direction D1.

The third connecting structure 30 includes a threaded hole 20*g* and a third through-hole 22*i*. The threaded hole 20*g* is provided at the fourth end portion 20*d* of the first clamp member 20. The third through-hole 22*i* is provided at the sixth end portion 22*d* of the second clamp member 22. The bolt 34 includes a shaft portion 34*a* having an external thread 34*b*. The shaft portion 34*a* is configured to extend through the third through-hole 22*i*. The external thread 34*b* is configured to be screwed in the threaded hole 20*g*. When the bolt 34 is tightened in a state where the bicycle handlebar H extends through the clamp opening 14*a*, the second clamp member 22 and the connecting member 24 pivot about the pivot axis X2. This causes the bicycle handlebar H to be clamped between the first clamp member 20 and the second clamp member 22.

Figure 6:
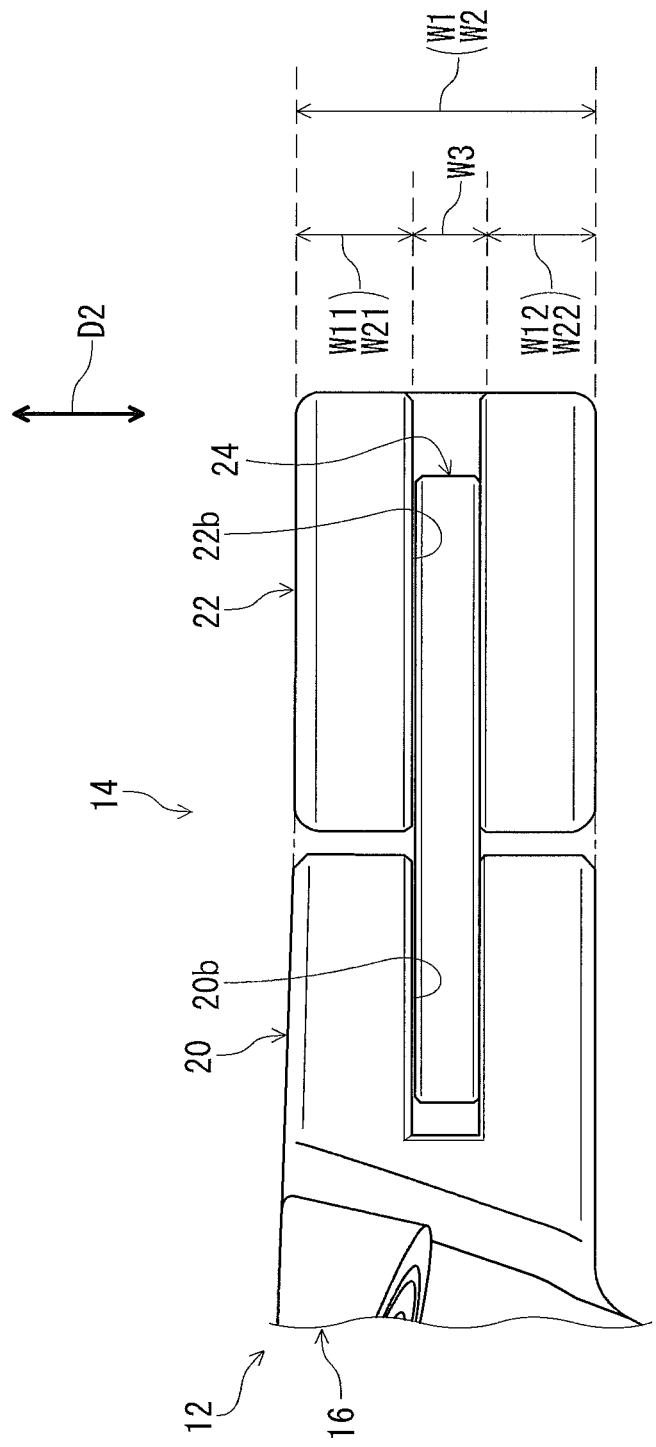
FIG. 6 is a partial plan view of the bicycle clamp structure illustrated in FIG. 3.

As seen in FIG. 6, the first clamp member 20 has a first width W1 defined in the axial direction D2 of the handlebar (the bicycle tube member) H. The second clamp member 22 has a second width W2 defined in the axial direction D2. The connecting member 24 has a third width W3 defined in the axial direction D2. The third width W3 is smaller than the first width W1 and the second width W2. In the illustrated embodiment, each of the first width W1, the second width W2, and the third width W3 is a minimum width in the axial direction D2. The first width W1 is substantially the same as the second width W2. The first clamp member 20 has a fourth width W11 and a fifth width W12 which are defined in the axial direction D2. The fourth width W11 and the fifth width W12 are widths of parts separated in the axial direction D2 by the first slit 20*b*. The second clamp member 22 has a sixth width W21 and a seventh width W22 which are defined in the axial direction D2. The sixth width W21 and the seventh width W22 are widths of parts separated in the axial direction D2 by the second slit 22*b*. The third width W3 of the connecting member 24 is smaller than each of the fourth width W11, the fifth width W12, the sixth width W21, and the seventh width W22. In the illustrated embodiment, the fourth width W11, the fifth width W12, the sixth width W21, and the seventh width W22 are substantially the same as one another.

Figure 7:
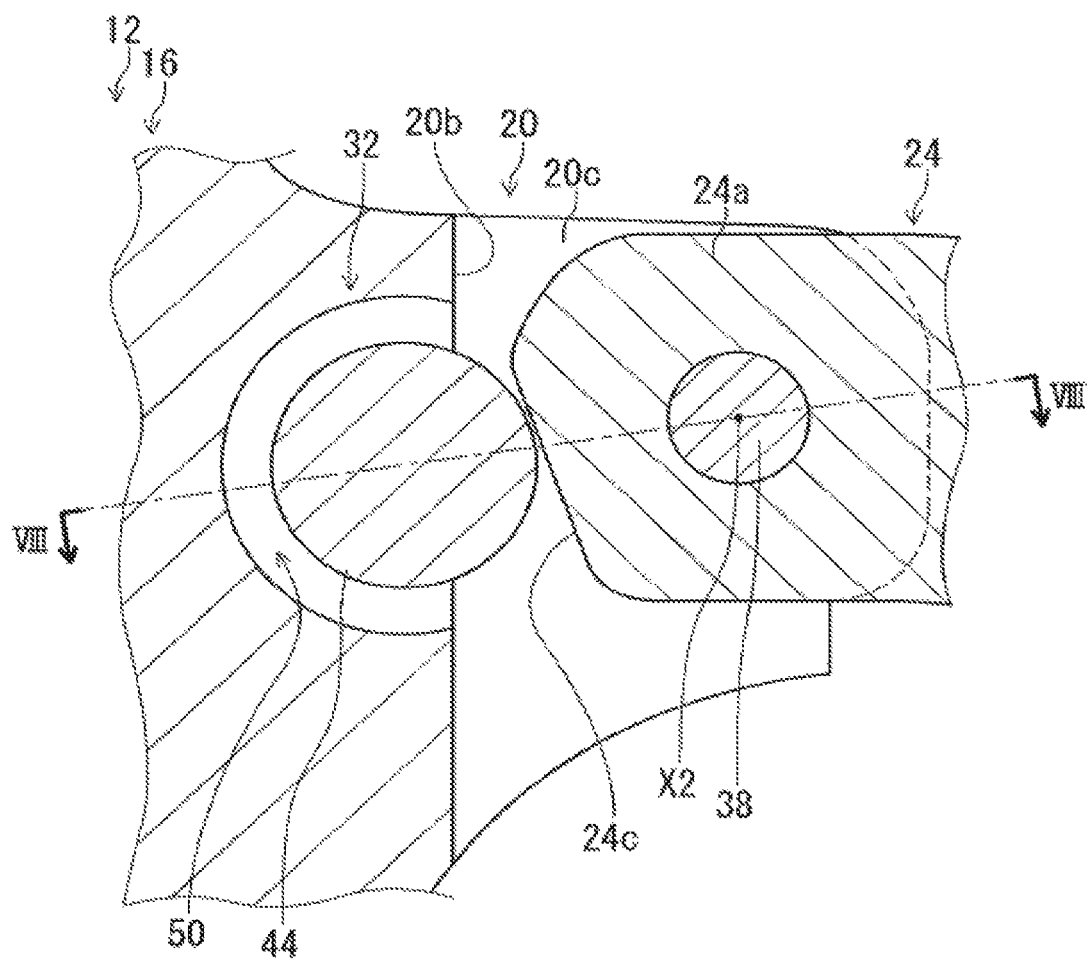
FIG. 7 is a partial enlarged cross-sectional view of the bicycle clamp structure illustrated in FIG. 5.

As seen in FIG. 7, the lock mechanism 32 is configured to restrict pivotal movement of the connecting member 24 with respect to the first clamp member 20. The lock mechanism 32 is provided on the first clamp member 20 and is disposed at the third end portion 20*c* of the first clamp member 20. However, it will be apparent to those skilled in the bicycle field from the present disclosure that the lock mechanism 32 can be provided on the second clamp member 22 or on both the first clamp member 20 and the second clamp member 22 if needed and/or desired. For example, in case that that the connecting member 24 is pivotally connected to the second clamp member 22 via the second connecting structure 28, the lock mechanism 32 is provided on the second clamp member 22. Furthermore, the lock mechanism 32 can be provided on the connecting member 24 if needed and/or desired.

Figure 8:
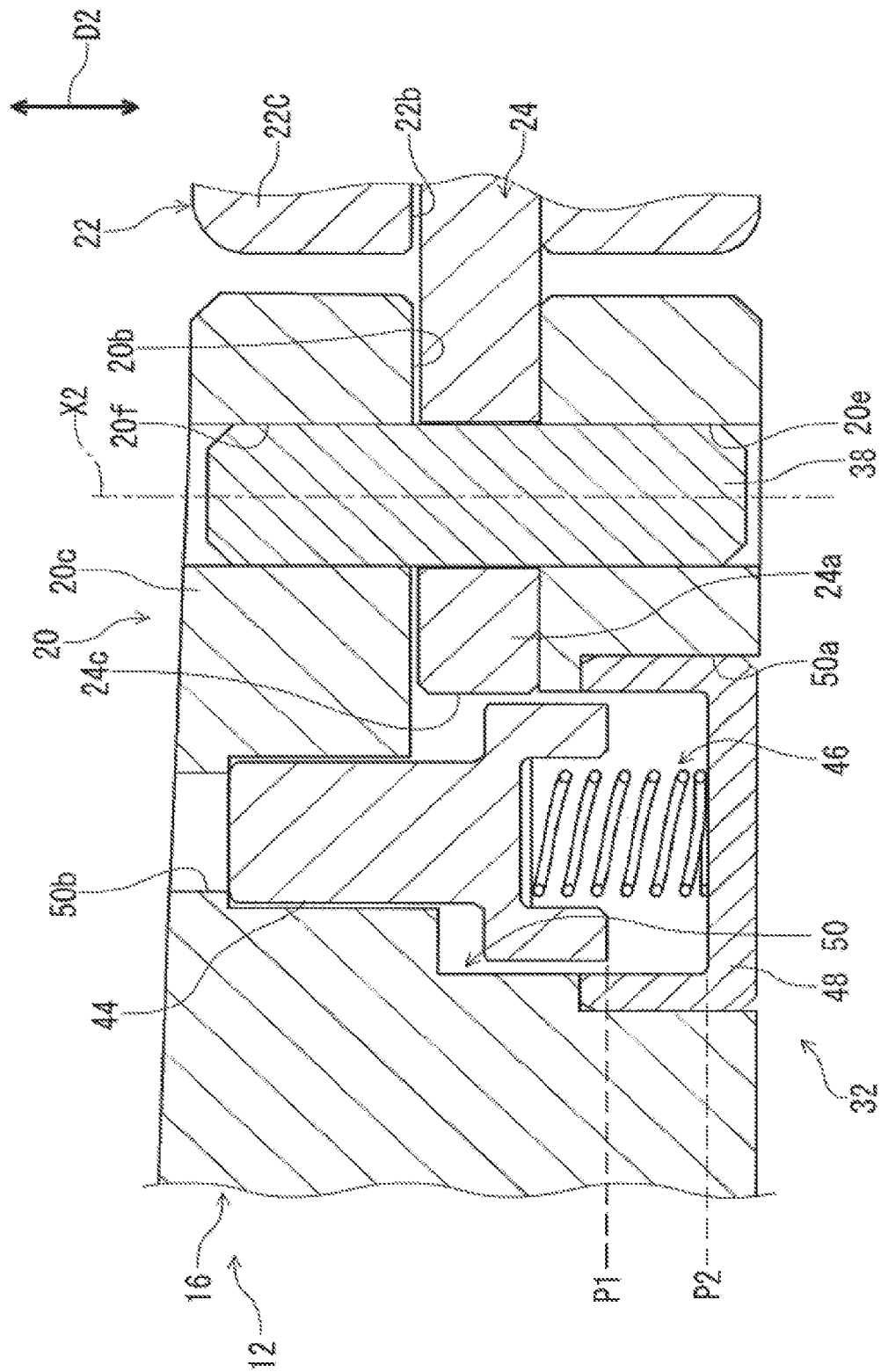
FIG. 8 is a partial cross-sectional view of the bicycle clamp structure taken along line VIII-VIII of FIG. 7.

As seen in FIGS. 7 and 8, the lock mechanism 32 includes a lock pin 44, a biasing member 46, an end cap 48, and a stepped hole 50. The lock pin 44 is provided in the first clamp member 20. In the illustrated embodiment, the lock pin 44 is provided in the third end portion 20*c* of the first clamp member 20. The stepped hole 50 is provided in the third end portion 20*c* of the first clamp member 20. The lock pin 44 is movably provided in the stepped hole 50 in the axial direction D2.

As seen in FIG. 8, the lock pin 44 is configured to be movable parallel to the axial direction D2 of the bicycle handlebar (the tube member) H to move between a lock position P1 and a release position P2. The lock position P1 is a position at which the lock pin 44 restricts pivotal movement of the connecting member 24 with respect to the first clamp member 20. The release position P2 is a position at which the lock pin 44 allows the connecting member 24 to pivot with respect to the first clamp member 20. As seen in FIGS. 7 and 8, the connecting member 24 includes a contact surface 24*c* configured to contact the lock pin 44 disposed at the lock position P1. While the contact surface 24*c* is a flat surface, it will be apparent to those skilled in the bicycle field from the present disclosure that the contact surface 24c can have other shapes.

As seen in FIG. 8, the biasing member 46 is provided in the first clamp member 20 and configured to bias the lock pin 44 to the lock position P1. The biasing member 46 is a spring, for example. The biasing member 46 is provided in the stepped hole 50 to be compressed between the lock pin 44 and the end cap 48. The lock mechanism 32 restricts pivotal movement of the connecting member 24 with respect to the first clamp member 20 about the pivot axis X2 in a state where the lock pin 44 is held by the biasing member 46 at the lock position P1.

As seen in FIG. 8, the end cap 48 is secured to the first clamp member 20. The stepped hole 50 is a through-hole extending in the axial direction D2. The stepped hole 50 has a first end opening 50a and a second end opening 50b opposite to the first end opening 50a in the axial direction D2. The first end opening 50a has an inner diameter larger than an inner diameter of the second end opening 50b. The end cap 48 is press-fitted in the first end opening 50a of the stepped hole 50, for example. The end cap 48 can be bonded to the stepped hole 50 with adhesive.

As seen in FIG. 8, an end of the lock pin 44 is exposed through the second end opening 50b to an outside of the first clamp member 20. The lock pin 44 can be pressed from the lock position P1 towards the release position P2 using a tool such as a hexagonal wrench through the second end opening 50b. This causes the lock pin 44 to be moved from the lock position P1 to the release position P2 in the axial direction D2, allowing the connecting member 24 and the second clamp member 22 to be pivoted about the pivot axis X2 relative to the first clamp member 20. Thus, the bicycle operating device 10 can be removed from the bicycle handlebar H for maintenance of the bicycle operating device 10 or other bicycle components.

In the above embodiments, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers in the terms "first", "second" or the like recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle clamp structure comprising:
   a first clamp member;
   a second clamp member configured to clamp a bicycle tube member between the first clamp member and the second clamp member;
   a connector arranged between the first clamp member and the second clamp member;
   a first connecting structure including at least one first hole and at least one first pivot pin, the first connecting structure pivotally connecting the first clamp member with the connector;
   a second connecting structure including at least two second holes and at least two second fixing pins; and
   a third connecting structure including at least two third holes and a bolt, the third connecting structure fixedly connecting the first clamp member with the second clamp member when the bicycle clamp structure is in a clamped state on the bicycle tube member,
   the second connecting structure fixedly and non-pivotally connecting the second clamp member with the connector so as to prevent the second clamp member from pivoting with respect to the connector even when the third connecting structure is not fixedly connecting the first clamp member with the second clamp member when the bicycle clamp structure is in a non-clamped state,
   wherein the at least two second fixing pins longitudinally extend within the at least two second holes in an axial direction of the at least two second fixing pins, and
   wherein one second hole of the at least two second holes has an elongated shape that is elongated in a direction that is orthogonal to the axial direction and that extends away from another second hole of the at least two second holes.

2. The bicycle clamp structure according to claim 1, wherein
   the first clamp member is made of a first material;
   the second clamp member is made of a second material;
   the connector is made of a third material which differs from at least one of the first material and the second material.

3. The bicycle clamp structure according to claim 2, wherein
   the third material differs from the first material and the second material.

4. The bicycle clamp structure according to claim 3, wherein
   the first material is the same as the second material.

5. The bicycle clamp structure according to claim 4, wherein
   the third material is harder than the first material and the second material.

6. The bicycle clamp structure according to claim 5, wherein
   the first material comprises an aluminum alloy,
   the second material comprises an aluminum alloy, and
   the third material is titanium, stainless steel, or iron.

7. The bicycle clamp structure according to claim 1, wherein the at least one first hole is a first through-hole provided on the connector, and the at least one first pivot pin is configured to be fixedly provided on the first clamp member and configured to pass through the first through-hole of the connector.

8. The bicycle clamp structure according to claim 1, wherein the at least two second holes are through-holes provided on the connector, and the at least two second fixing pins are configured to be fixedly provided on the second clamp member and configured to pass through the at least two second holes of the connector, respectively.

9. The bicycle clamp structure according to claim 1, wherein the first clamp member includes a first slit, and the connector includes a first end portion configured to be provided in the first slit.

10. The bicycle clamp structure according to claim 9, wherein the second clamp member includes a second slit, and the connector includes a second end portion configured to be provided in the second slit.

11. The bicycle clamp structure according to claim 1, wherein the first clamp member has a first outer width defined in an axial direction of the bicycle tube member, the second clamp member has a second outer width defined in the axial direction, the connector has a third outer width defined in the axial direction, and the third outer width is smaller than the first outer width and the second outer width.

12. The bicycle clamp structure according to claim 1, further comprising:

a lock configured to restrict pivotal movement of the connector with respect to the first clamp member.

13. The bicycle clamp structure according to claim 12, wherein the lock includes a lock pin provided in the first clamp member, and the lock pin is attached to the first clamp movably between a lock position at which the lock pin restricts pivotal movement of the connector with respect to the first clamp member, and a release position at which the lock pin allows the connector to pivot with respect to the first clamp member.

14. The bicycle clamp structure according to claim 13, wherein the lock pin is movably attached to the first clamp member in an axial direction of the bicycle tube member.

15. The bicycle clamp structure according to claim 13, wherein the lock includes a spring provided in the first clamp member and configured to bias the lock pin to the lock position.

16. The bicycle clamp structure according to claim 15, wherein the connector includes a contact surface configured to contact the lock pin disposed at the lock position.

17. A bicycle operating device comprising:

the bicycle clamp structure according to claim 1; and an operating structure including at least one of a brake operating device and a shift operating device configured to operate a bicycle component and provided on one of the first clamp member, the second clamp member and the connector.

18. The bicycle operating device according to claim 17, wherein the operating structure includes the brake operating device configured to operate a bicycle brake component.

19. The bicycle clamp structure according to claim 1, wherein the one second hole of the at least two second holes has an oval shape when viewed in the axial direction, and the another second hole of the at least two second holes has a circular shape when viewed in the axial direction.

* * * * *